United States Patent
Rokusek et al.

(10) Patent No.: US 7,676,250 B2
(45) Date of Patent: Mar. 9, 2010

(54) METHOD FOR CONTROLLING AUDIO SIGNALS TO AN FM TRANSMITTER AND A LOUDSPEAKER OF A HANDS-FREE ADAPTER

(75) Inventors: Daniel S Rokusek, Long Grove, IL (US); Sang Y Oh, Lake Zurich, IL (US); David A Vanyek, Libertyville, IL (US); Kevin L Weirich, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 658 days.

(21) Appl. No.: 11/421,837

(22) Filed: Jun. 2, 2006

(65) Prior Publication Data

US 2007/0281648 A1    Dec. 6, 2007

(51) Int. Cl.
*H04M 1/00* (2006.01)
(52) U.S. Cl. .................... 455/570; 455/3.06; 455/569.1
(58) Field of Classification Search ................. 455/3.06, 455/569.1, 570
See application file for complete search history.

(56) References Cited

U.S. PATENT DOCUMENTS

| | | | |
|---|---|---|---|
| 6,163,711 | A | 12/2000 | Juntunen et al. |
| 6,304,764 | B1 | 10/2001 | Pan |
| 6,909,894 | B1 | 6/2005 | Kingsley et al. |
| 2002/0086716 | A1 | 7/2002 | Pan |
| 2002/0132647 | A1* | 9/2002 | Chia et al. ................. 455/570 |
| 2004/0204158 | A1* | 10/2004 | Wang et al. .............. 455/569.1 |
| 2004/0204163 | A1 | 10/2004 | Ou |
| 2005/0143063 | A1* | 6/2005 | Mizutani et al. ......... 455/426.1 |
| 2005/0143139 | A1 | 6/2005 | Park et al. |

FOREIGN PATENT DOCUMENTS

| | | |
|---|---|---|
| WO | 0163889 A1 | 8/2001 |
| WO | 03052947 A2 | 6/2003 |

OTHER PUBLICATIONS

Innovative Products: Wireless Hands Free+FM Audio Transmitter; http://www.hitequest.com/Projects/buy_fm_handsfree.htm; 2 pages.
FM Hands Free Car Kit: Car Baby; http://www.cell-phone-accessory.com/handsfree-car-kit.htm; 2 pages.

* cited by examiner

*Primary Examiner*—Nick Corsaro
*Assistant Examiner*—Amanuel Lebassi
(74) *Attorney, Agent, or Firm*—Sylvia Chen

(57) ABSTRACT

A method (200) for controlling audio signals to an FM transmitter and a loudspeaker of a hands-free adapter first sends a first audio signal to the loudspeaker (242) and measures and records a loudspeaker audible artifact such as echo return loss (244) and/or echo tail length (246). Next, the hands-free adapter sends a second audio signal to the FM transmitter and the loudspeaker (252) and measures and records an FM transmitter and loudspeaker audible artifact such as echo return loss (254) and/or echo tail length (256). If the FM transmitter and loudspeaker audible artifact minus the loudspeaker audible artifact is greater than a threshold (263, 266), the hands-free adapter sends a third audio signal to the FM transmitter only (270), and if the FM transmitter and loudspeaker audible artifact minus the loudspeaker audible artifact is not greater than the threshold, the hands-free adapter sends the third audio signal to both the FM transmitter and the loudspeaker (280).

19 Claims, 4 Drawing Sheets

METHOD FOR CONTROLLING AUDIO SIGNALS TO AN FM TRANSMITTER AND A LOUDSPEAKER OF A HANDS-FREE ADAPTER

FIELD OF THE DISCLOSURE

This disclosure relates generally to hands-free mobile phone kits often used in motor vehicles, and especially hands-free mobile phone kits that utilize FM radio systems.

BACKGROUND OF THE DISCLOSURE

Drivers often use hands-free car kits to receive, conduct, and place telephone calls while in a motor vehicle. Some hands-free car kits (also called hands-free mobile phone kits or hands-free adapters) include a low-power FM transmitter to broadcast an audio signal on a certain FM channel to an existing FM receiver in the motor vehicle's radio system. Thus, when the FM radio is on and set to the proper FM channel at a reasonable volume, a user hears a ringing alert and/or a telephone conversation through the built-in sound system of the automobile.

Because the FM receiver of a motor vehicle may be off or at a low volume, or tuned to a radio station that does not match the low-power FM transmitter in the hands-free car kit, parts of telephone conversations may be lost while a user turns on the FM receiver, sets an appropriate volume, and selects the proper FM channel.

To overcome this, some hands-free mobile phone kits allow the user to switch between (1) an FM transmitter mode that uses the speakers associated with the car's FM receiver and (2) a built-in speaker mode that uses a hands-free speaker of the mobile phone itself. Still, if the car kit is in FM transmitter mode, and the nearby FM receiver is off, is at a low volume, or is tuned to the wrong FM channel, part of a telephone conversation may be lost. Thus, there is an opportunity to control intelligently the FM transmitter and the built-in speaker of a hands-free mobile phone kit so that no part of a telephone conversation is lost due to the FM receiver being off, at a low volume, or tuned to the wrong channel.

The various aspects, features, and advantages of the disclosure will become more fully apparent to those having ordinary skill in the art upon careful consideration of the following Drawings and accompanying Detailed Description.

DETAILED DESCRIPTION

A hands-free adapter has both an FM transmitter and a loudspeaker. Depending on the mode of the hands-free adapter and the results of a test for a nearby FM radio (for receiving audio signals from the FM transmitter), the hands-free adapter sends audio signals to the FM transmitter, the loudspeaker, or both. The testing process uses a microphone of the hands-free adapter, in conjunction with a processor and echo canceller, to measure and record audible artifacts in a control situation (e.g., audio signals sent to the loudspeaker only) and a variable situation (e.g., audio signals sent to the loudspeaker and the FM transmitter, but the FM radio may not be properly set to receive the FM transmitter signals). If the audible artifacts of the control situation are not appreciably less than the audible artifacts of the variable situation, the processor concludes that the FM radio is not properly set to receiver the FM transmitter signals and sends further audio signals to both the loudspeaker and FM transmitter. If the audible artifacts of the variable situation are greater by a threshold than the audible artifacts of the control situation, the processor concludes that a nearby FM radio has received the FM transmitter signals and sends further audio signals to the FM transmitter only.

A method for controlling audio signals to an FM transmitter and a loudspeaker of a hands-free adapter first sends a first audio signal to the loudspeaker and measures and records a loudspeaker audible artifact such as echo return loss and/or echo tail length. Next, the hands-free adapter sends a second audio signal to the FM transmitter and the loudspeaker and measures and records an FM transmitter and loudspeaker audible artifact such as echo return loss and/or echo tail length. If the FM transmitter and loudspeaker audible artifact minus the loudspeaker audible artifact is greater than a threshold, the hands-free adapter sends a third audio signal to the FM transmitter only, and if the FM transmitter and loudspeaker audible artifact minus the loudspeaker audible artifact is not greater than the threshold, the hands-free adapter sends the third audio signal to both the FM transmitter and the loudspeaker.

This method allows the hands-free adapter to test whether a user has properly turned on and set a nearby FM radio to a proper channel and volume to receive signals from the FM transmitter of the hands-free adapter. If the user has not properly set the FM radio, the hands-free adapter sends audio signals to both the FM transmitter and the loudspeaker of the adapter to provide redundancy until the FM radio is properly set. After the FM radio is properly set, a further occurrence of the test can cause the adapter to send audio signals to its FM transmitter only.

Figure 1:
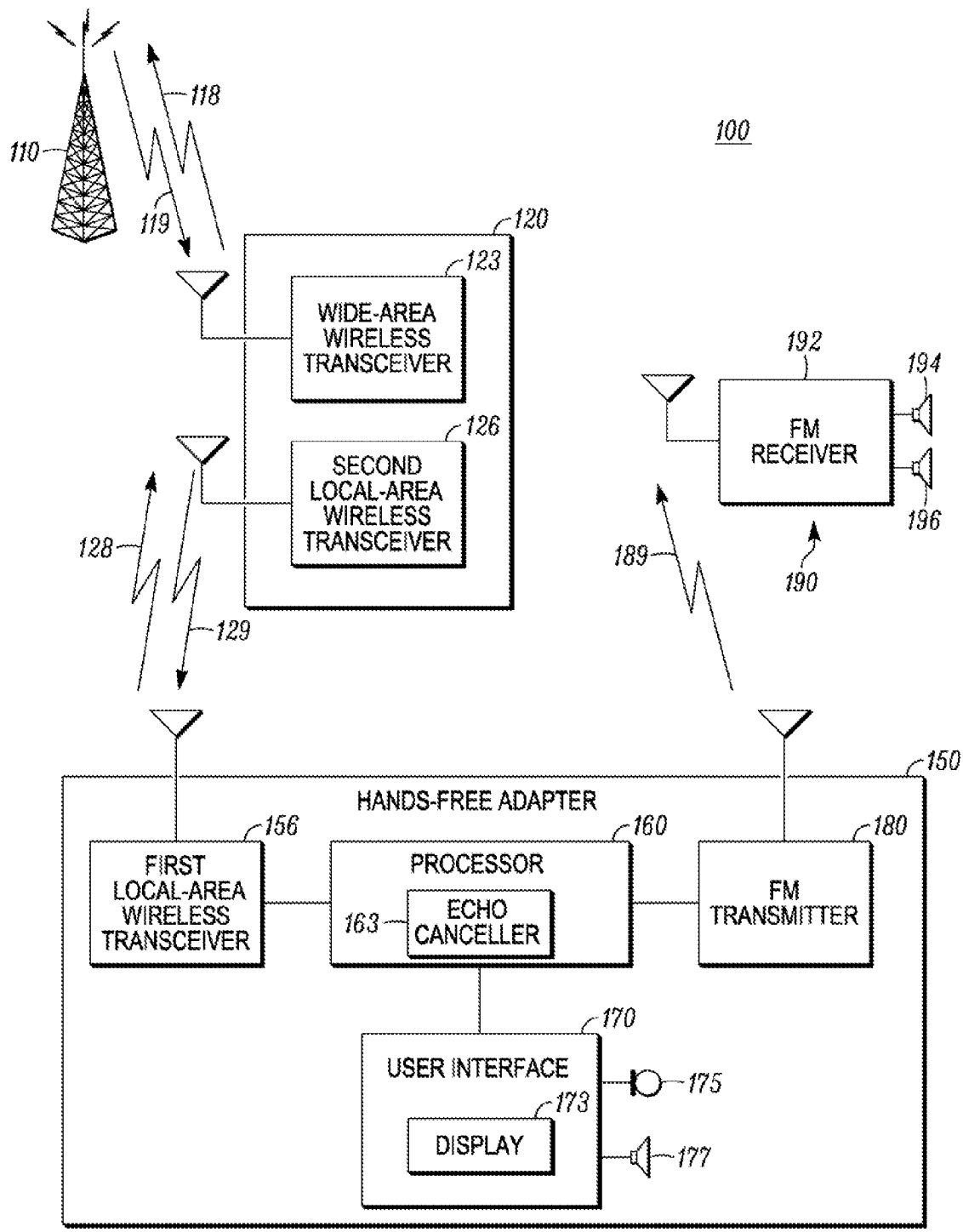
FIG. 1 shows a schematic diagram of a hands-free adapter for use with a mobile phone and an FM radio according to an embodiment.

FIG. 1 shows a schematic diagram 100 of a hands-free adapter 150 for use with a mobile phone 120 and an FM radio system 190 according to an embodiment. In this embodiment, a mobile phone 120 receives signals 119 from a base station of a cellular system 110 using a wide-area wireless transceiver 123. The wide-area wireless transceiver 123 demodulates and decodes audio and signaling information from the wide-area signals 119 and transmits audio and signaling signals 129 to the hands-free adapter 150 using a short-range wireless link such as BlueTooth®. The short-range wireless link is maintained by a first local-area wireless transceiver 156 in the hands-free adapter and a second local-area wireless transceiver 126 in the mobile phone 120. A benefit of a Blue-Tooth® link is that, after the mobile phone 120 has been paired with the hands-free adapter 150, a user can bring the mobile device 120 within range of the adapter 150, and the adapter 150 can be programmed to automatically discover and connect with the mobile phone 120 when the adapter is turned on.

The hands-free adapter 150 uses a low-power FM transmitter 180 to transmit alert and audio signals 189 to a nearby FM receiver 192 with associated amplifier and loudspeakers 194, 196. In this manner, incoming audio information and alert signals can be transmitted from the base station of a cellular system 110 through a mobile phone 120 through a hands-free adapter 150 to loudspeakers 194, 196 of an FM radio system 190.

The hands-free adapter 150 also includes a user interface 170 with a display 173, a microphone 175, and a loudspeaker 177. This loudspeaker 177 is available should the user select a loudspeaker mode for the hands-free adapter 150 and also if the user selects an FM transmitter mode for the hands-free adapter 150 as will be described with reference to FIG. 2. The microphone 175 is used during both loudspeaker mode and FM transmitter mode. The microphone 175 picks up audio signals from the user, and coded audio signals 128 are sent to the mobile phone 120 over the local-area link, and the mobile phone 120 further sends recoded audio signals 118 to the cellular system 110 so a remote party can hear the user. The hands-free adapter 150 also includes a processor 160 and an echo canceller 163 to aid in the transmission of the audio signal having good sound quality.

Figure 2:
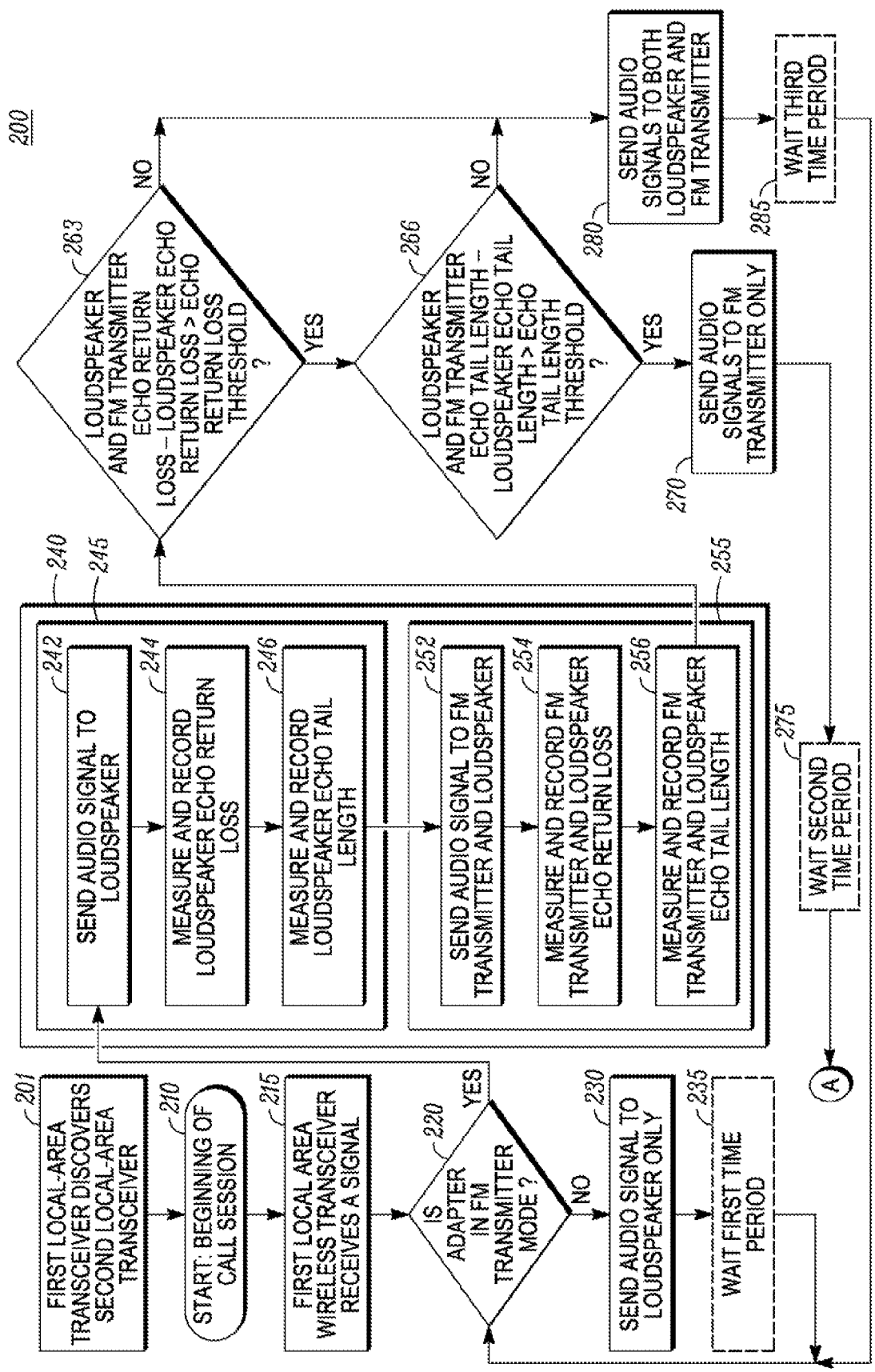
FIG. 2 shows a first flow chart for initially controlling audio signals to an FM transmitter and a loudspeaker of the hands-free adapter shown in FIG. 1 according to an embodiment.

FIG. 2 shows a first flow chart 200 for initially controlling audio signals to an FM transmitter 180 and a loudspeaker 177 of the hands-free adapter 150 shown in FIG. 1 according to an embodiment. In this embodiment, the first local-area wireless transceiver 156 and the second local-area wireless transceiver 126 are both Bluetooth® transceivers and thus, after they have been paired, will discover and connect to each other when they are on and come within range of each other as shown in step 201.

Step 210 starts a method for controlling audio signals to the FM transmitter 180 and the loudspeaker 177 of the hands-free adapter 150 when a call session begins. A call session begins, from the hands-free adapter's point of view, when a user initiates an outgoing call using the adapter, answers an incoming call using the adapter, or transfers an on-going call session to the hands-free adapter. In the incoming call situation, the first local area wireless transceiver 156 receives a signal 215 such as an alert (ringing) signal from the mobile phone 120. Even if the mobile phone 120 is in a vibrate mode, the ringing signal can received by the first local area wireless transceiver through the signaling links of a BlueTooth® connection. In the outgoing call situation, the user may initiate a call using the hands-free adapter 150, usually by pressing a button on the adapter, and the first local area wireless transceiver receives that signal 215 for transmission to the mobile phone 120. In the transfer situation, the call may transfer automatically from the mobile phone 120 to the hands-free adapter 150 or the user may initiate a transfer by pressing a button on the adapter.

Next, if the hands-free adapter 150 is not in an FM transmitter mode as determined by step 220, the processor 160 sends audio signals to the loudspeaker only in step 230. Optionally, the processor 160 waits for a first time period 235, re-checks if the user has switched the mode of the adapter in step 220, and reacts accordingly.

If step 220 determines the hands-free adapter is in an FM transmitter mode, the hands-free adapter 150 uses the echo canceller 163 to measure and record audible artifacts in the environment under various conditions 240 in order to determine if an FM radio 190 is on, at an appreciable volume, and tuned to a channel that will receive the audio signals from the FM transmitter 180. In this embodiment, the hands-free adapter 150 sends an audio signal to the loudspeaker 245 first to establish a control value and then sends an audio signal to the FM transmitter and the loudspeaker 255 to find a variable value. Alternately, the adapter could first send an audio signal to the FM transmitter and the loudspeaker followed by sending an audio signal to the loudspeaker. Or, the adapter could test audible artifacts from both the FM transmitter and the loudspeaker in parallel. Although the audio signal is being used as a test signal in step 240, it may also carry information useful for the mobile phone user. For example, a ring signal of an incoming call may trigger a repeating audio alert that is useful for testing the FM transmitter. Also, testing may occur during a telephone conversation.

Within step 240, an audio signal is sent to the loudspeaker 177 and measured by the microphone 175 to form a control measurement for various audible artifacts in step 245, such as echo return loss and echo tail length. First, step 242 sends an audio signal to the loudspeaker 177. Next, the microphone 175 and processor 160 with echo canceller 163 measures and records the loudspeaker echo return loss 244 and measures and records the loudspeaker echo tail length 246. Step 244 and step 246 may be performed in any order, including simultaneously.

Within step 240, an audio signal is sent to the loudspeaker and the FM transmitter to form a variable measurement for audible artifacts in step 255, such as echo return loss and echo tail length. First, step 252 sends an audio signal to the FM transmitter and the loudspeaker. Next, step 254 measures and records the FM transmitter and loudspeaker echo return loss and step 256 measures and records the FM transmitter and loudspeaker echo tail length. Step 254 and step 256 may be performed in an order, including simultaneously.

It is expected that if the FM radio is on and tuned to the correct channel with a reasonable volume, the echo return loss and echo tail length for the variable situation in step 255 will be greater than the echo return loss and echo tail length for the control situation in step 245. A repetitive ringing signal would allow for the same audio signal to be used in both step 245 and step 255. If a repetitive ringing signal is not appropriate, other audio signals can be used that may be repetitive or non-repetitive.

Step 263 determines if the recorded FM transmitter and loudspeaker echo return loss minus the loudspeaker echo return loss is greater than an echo return loss threshold. Step 266 determines if the recorded FM transmitter and loudspeaker echo tail length minus the loudspeaker echo tail length is greater than an echo tail length threshold. If both step 263 and step 266 are determined to be YES, the hands-free adapter 150 concludes that the FM radio is properly receiving audio signals from the FM transmitter and thus sends future audio signals to the FM transmitter only 270. Optional step 275 waits a second time period before checking whether the adapter is still in FM transmitter mode, in case the user has switched modes or turned off the FM receiver. See FIG. 3.

If either step 263 or step 266 is determined to be NO, the adapter does not conclude that the FM transmitter is on and set to the correct channel at a reasonable volume. In this situation, the processor 160 sends future audio signals to both the loudspeaker and the FM transmitter 280. This allows the user to hear the phone call using the loudspeaker even if the FM radio is not set properly and the adapter is in FM transmitter mode. Optional step 285 waits a third time period to re-evaluate the situation in case the user has increased the volume on the FM receiver, changed the channel of the FM receiver, or turned on the FM receiver.

In this embodiment, the third time period is shorter than the first and second time periods. If the adapter is not in FM transmitter mode, it is presumed that the user wants to use the loudspeaker only, and thus the first time period is long or step 235 is not implemented. Similarly, if the adapter is in FM transmitter mode and the adapter has determined in steps 240, 263, and 266 that the FM receiver is properly receiving the audio signals from the FM transmitter, then it is presumed that the user intends to use the FM radio speakers 194, 196 instead of the loudspeaker 177 and the second time period is long or step 275 is not implemented.

On the other hand, if the adapter is in FM transmitter mode but steps 240, 263, and 266 have determined that the FM radio is not properly receiving the FM transmitter signals, then perhaps the user intends to use the FM radio speakers 194, 196 but has not yet turned on the FM receiver or set the correct channel and volume. Thus, sending the audio signals to the loudspeaker and the FM transmitter allows the telephone call to be heard over the loudspeaker while the user corrects the situation with the FM radio. In this embodiment, the third period in step 285 is short so that the adapter 150 can re-evaluate the situation quickly after the FM radio has been properly set.

Figure 3:
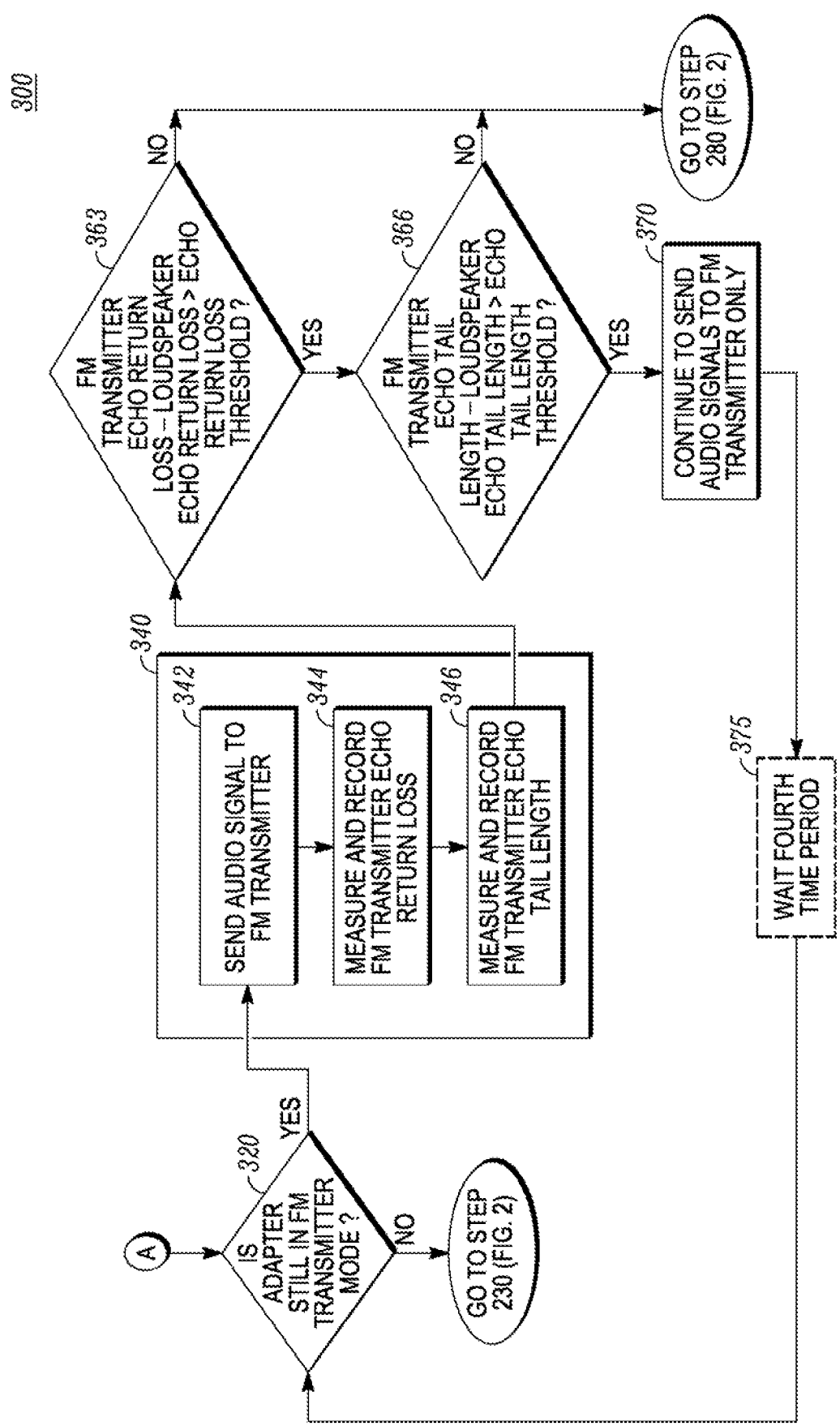
FIG. 3 shows a second flow chart for subsequently controlling audio signals to an FM transmitter and a loudspeaker of the hands-free adapter shown in FIG. 1 according to an embodiment.

FIG. 3 shows a second flow chart 300 for subsequently controlling audio signals to an FM transmitter and a loudspeaker of the hands-free adapter shown in FIG. 1 according to an embodiment. After the initial determination in step 270 of FIG. 2 to send audio signals to the FM transmitter only, the hands-free adapter 150 makes further evaluations to determine whether the adapter is still in FM transmitter mode and whether the FM transmitter is continuing to receive and play the audio signals at an appropriate volume.

If step 320 determines that the hands-free adapter 150 is not still in an FM transmitter mode, the flow returns to step 230 (FIG. 2) and the processor 160 sends audio signals to the loudspeaker only.

If step 320 determines the hands-free adapter is still in an FM transmitter mode, the hands-free adapter 150 uses the echo canceller 163 to measure and record audible artifacts in the environment under various conditions 340 in order to determine if an FM radio 190 is still on, at an appreciable volume, and tuned to a channel that will receive the audio signals from the FM transmitter 180. In this embodiment, the audio artifacts from the audio signal previously sent to the loudspeaker in step 245 (FIG. 2) continue to be used as control values. Step 340 sends an audio signal to the FM transmitter to find variable values. Alternately, the adapter could send an audio signal to the loudspeaker to create new control measurements followed by sending an audio signal to the FM transmitter. Or, the adapter could test audible artifacts from both the FM transmitter and the loudspeaker in parallel. Although the audio signal is being used as a test signal in step 340, it may also carry information useful for the mobile phone user. For example, testing may occur during a telephone conversation.

Within step 340, an audio signal is sent to the FM transmitter 180 to form a variable measurement for audible artifacts, such as echo return loss and echo tail length. First, step 342 sends an audio signal to the FM transmitter. Next, step 344 measures and records the FM transmitter echo return loss and step 346 measures and records the FM transmitter echo tail length. Step 344 and step 346 may be performed in an order, including simultaneously.

It is expected that if the FM radio is on and tuned to the correct channel with a reasonable volume, the echo return loss and echo tail length for the variable situation in step 340 will be similar to or greater than the echo return loss and echo tail length for the control situation in step 245 (FIG. 2). Step 363 determines if the recorded FM transmitter echo return loss minus the loudspeaker echo return loss is greater than an echo return loss threshold. Step 366 determines if the recorded FM transmitter echo tail length minus the loudspeaker echo tail length is greater than an echo tail length threshold. If both step 363 and step 366 are determined to be YES, the hands-free adapter 150 concludes that the FM radio is continuing to properly receive audio signals from the FM transmitter and thus sends future audio signals to the FM transmitter only 370. Optional step 375 waits a fourth time period before checking whether the adapter is still in FM transmitter mode, in case the user has switched modes or turned off the FM receiver. The fourth time period can be predetermined or adaptive. As an example of an adaptive fourth time period, if the audible artifacts measurements direct the flow to select step 370 repeatedly during a telephone call, the fourth time period could be increased in one-minute increments.

If either step 363 or step 366 is determined to be NO, the adapter does not conclude that the FM transmitter is on and set to the correct channel at a reasonable volume. In this situation, flow returns to step 280 (FIG. 2), and the processor 160 sends future audio signals to both the loudspeaker and the FM transmitter 280.

Additionally, a hysteresis function can be used in step 363 and step 366 to adjust the echo return loss threshold and/or the echo tail length threshold to prevent frequent switches between sending audio signals to the FM transmitter only 370 and sending audio signals to both the loudspeaker and the FM transmitter 280 due to minor differences during subsequent audio artifact measurements.

Figure 4:
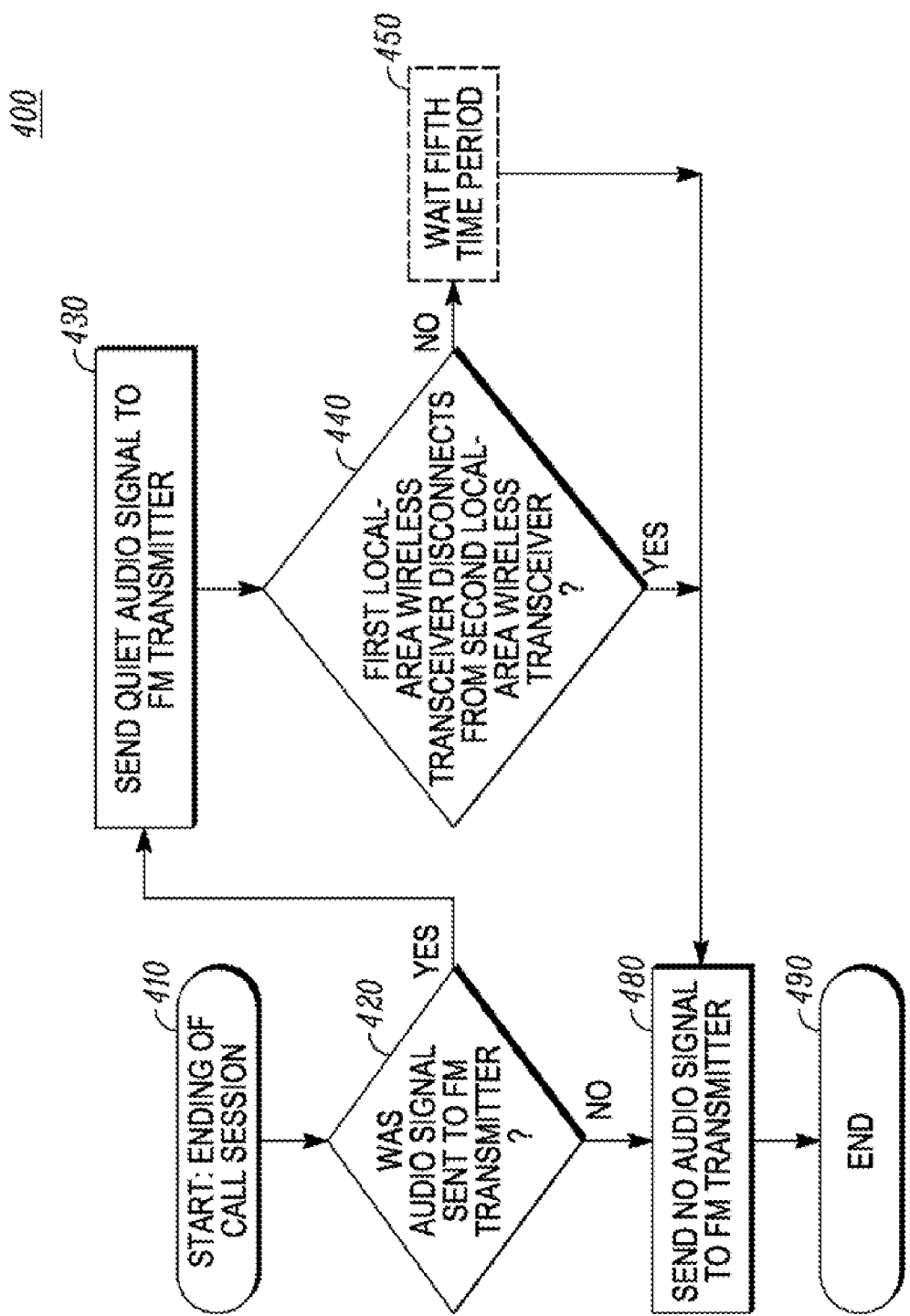
FIG. 4 shows a third flow chart for controlling audio signals to an FM transmitter and a loudspeaker of the hands-free adapter shown in FIG. 1 according to an embodiment.

FIG. 4 shows a third flow chart 400 for controlling audio signals to an FM transmitter 180 and a loudspeaker 177 of the hands-free adapter 150 shown in FIG. 1 according to an embodiment. In this embodiment, the flow starts in step 410 at the ending of a call session. A call session ends, from the hands-free adapter's point of view, when the user or the remote party hangs up the telephone call, or when the user indicates to the adapter that the on-going conversation will no longer use the adapter. Step 420 determines if audio signals were recently sent to the FM transmitter 180, for example if audio signals were recently sent to the FM transmitter in step 270 or step 280 of FIG. 2 or step 370 of FIG. 3. If no audio signal was sent to the FM transmitter, then the adapter sends no audio signal to the FM transmitter in step 480 and the flow ends 490.

If, however, audio signals were recently sent to the FM transmitter 180, in step 430 the hands-free adapter sends a quiet audio signal to the FM transmitter. This quiet audio signal can represent silence, or low-volume white noise, and it prevents the FM transmitter from picking up and amplifying signal noise and creating loud static or popping sounds on the FM radio loudspeakers 194, 196. If step 440 determines that the first local-area wireless transceiver disconnects from the second local-area wireless transceiver, then the adapter turns off and no audio signal is sent to the FM transmitter in step 480 and the flow ends 490. If the first local-area wireless transceiver maintains its connection with the second local-area wireless transceiver, the adapter waits a fifth time period 450, to give the user time to change the channel of the FM receiver or turn off the FM receiver, before sending no audio signal to the FM transmitter.

In this embodiment, the adapter 150 is battery-powered, and the adapter turns off after the second local-area wireless transceiver 126 disconnects from the first local-area wireless transceiver 156. In other embodiments, the adapter is powered from a cigarette lighter adapter of a motor vehicle or other power source from its environment and, in that case, power conservation is not as crucial.

Thus, the method for controlling audio signals to an FM transmitter and a loudspeaker of a hands-free adapter allows a user to hear an entire telephone conversation through either an FM radio system or a loudspeaker of the adapter even when the FM radio system has not yet been turned on and set to the correct channel at a reasonable volume. The method periodically re-evaluates the situation to determine whether the FM radio is properly set up and sends audio signals to both the loudspeaker and the FM transmitter only for as long as needed to bridge the time gap when the user is setting up the FM radio. The method is useful not only for telephone conversations but also for playing music, such as MP3 files, on the mobile phone through a nearby FM radio system. The method can implemented in a completely wireless fashion with a first wireless connection between the mobile phone and the hands-free adapter and a second wireless connection between the hands-free adapter and the FM radio system.

Although the hands-free adapter is particularly suited for vehicular environments, it can also be used in any environment with a nearby FM radio, such as a home or office stereo system.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, a processor 160 includes a processor or controller that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method for controlling audio signals of a hands-free adapter having an FM transmitter and a loudspeaker comprising:
    sending a first audio signal to the loudspeaker;
    measuring and recording a loudspeaker audible artifact;
    sending a second audio signal to the FM transmitter and the loudspeaker;
    measuring and recording an FM transmitter and loudspeaker audible artifact;
    if the FM transmitter and loudspeaker audible artifact minus the loudspeaker audible artifact is greater than a first threshold, sending a third audio signal to the FM transmitter only; and
    if the FM transmitter and loudspeaker audible artifact minus the loudspeaker audible artifact is not greater than the first threshold, sending the third audio signal to the FM transmitter and the loudspeaker.

2. A method according to claim 1 wherein the first audio signal and the second audio signal are identical.

3. A method according to claim 2 wherein the first audio signal and the second audio signal are ringing signals.

4. A method according to claim 1 further comprising:
    determining if the hands-free adapter is in an FM transmitter mode; and
    if the hands-free adapter is not in an FM transmitter mode, sending the third audio signal to the loudspeaker only.

5. A method according to claim 4 further comprising:
    waiting a first time period; and
    returning to the step of determining if the adapter is in an FM transmitter mode.

6. A method according to claim 1 further comprising:
    waiting a second time period after sending a third audio signal to the FM transmitter only;
    determining if the adapter is in an FM transmitter mode; and
    sending a fourth audio signal to the FM transmitter, if the adapter is in the FM transmitter mode;
    measuring and recording an FM transmitter audible artifact;
    if the FM transmitter audible artifact minus the loudspeaker audible artifact is greater than a second threshold, sending a fifth audio signal to the FM transmitter only; and
    if the FM transmitter audible artifact minus the loudspeaker audible artifact is not greater than the second threshold, sending the fifth audio signal to the FM transmitter and the loudspeaker.

7. A method according to claim 6 wherein the first threshold is equal to the second threshold.

8. A method according to claim 6 wherein the first threshold is different from the second threshold.

9. A method according to claim 6 further comprising:
    waiting a fourth time period after sending the fifth audio signal to the FM transmitter only; and
    returning to the step of sending a fourth audio signal to the FM transmitter.

10. A method according to claim 1 further comprising:
    waiting a third time period after sending a third audio signal to the FM transmitter and the loudspeaker;
    determining if the adapter is in an FM transmitter mode; and
    returning to the step of sending a first audio signal to the loudspeaker, if the adapter is in an FM transmitter mode.

11. A method according to claim 1 further comprising:
ending a call session;
determining if an audio signal was recently sent to the FM transmitter;
sending a quiet audio signal to the FM transmitter if an audio signal was recently sent to the FM transmitter.

12. A method according to claim 11 further comprising:
sending no audio signal to the FM transmitter if an audio signal was not recently sent to the FM transmitter.

13. A method according to claim 11 further comprising:
determining if a first local-area wireless transceiver has disconnected from a second local-area wireless transceiver; and
sending no audio signal to the FM transmitter if a first local-area wireless transceiver has disconnected from a second local-area wireless transceiver.

14. A method according to claim 13 further comprising:
waiting a fifth time period and then sending no audio signal to the FM transmitter if the first local-area wireless transceiver has not disconnected from a second local-area wireless transceiver.

15. A hands-free adapter comprising:
a first local-area wireless transceiver;
a processor, coupled to the first local-area wireless transceiver, having an echo canceller;
a user interface coupled to the processor having a microphone and a loudspeaker;
an FM transmitter coupled to the processor,
wherein the processor, the microphone, and the echo canceller measure and record a first audible artifact when a first audio signal is sent to the loudspeaker, measure and record a second audible artifact when a second audio signal is sent to the loudspeaker and the FM transmitter, and compares the first audible artifact with the second audible artifact to determine if a nearby FM receiver has received the second audio signal from the FM transmitter.

16. A hands-free adapter according to claim 15 wherein the first audible artifact is a first echo return loss and the second audible artifact is a second echo return loss.

17. A hands-free adapter according to claim 15 wherein the first audible artifact is a first echo tail length and the second audible artifact is a second echo tail length.

18. A hands-free adapter according to claim 15 wherein if the second audible artifact is greater than the first audible artifact by more than a threshold value, then the processor sends a third audio signal to the FM transmitter only.

19. A hands-free adapter according to claim 15 wherein if the second audible artifact is not greater than the first audible artifact by more than a threshold value, then the processor sends a third audio signal to the FM transmitter and the loudspeaker.

* * * * *